S. J. SHAW.
PISTON RING.
APPLICATION FILED APR. 25, 1914.
1,168,969.
Patented Jan. 18, 1916.
2 SHEETS—SHEET 1.
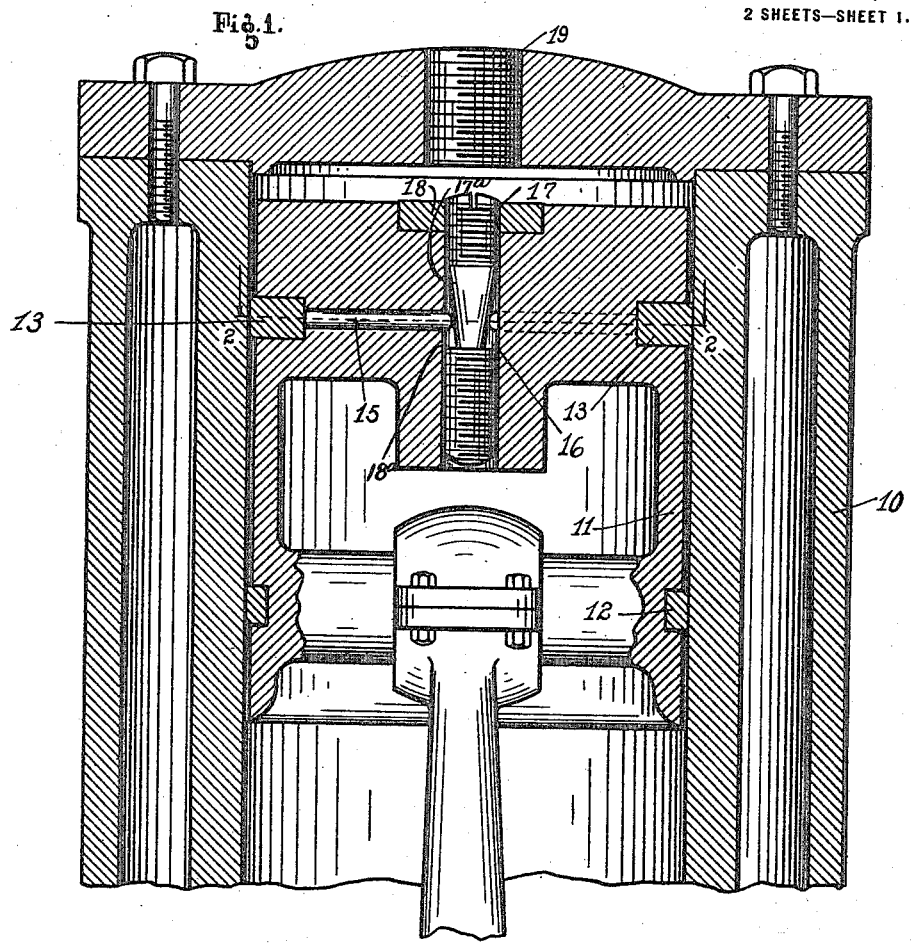
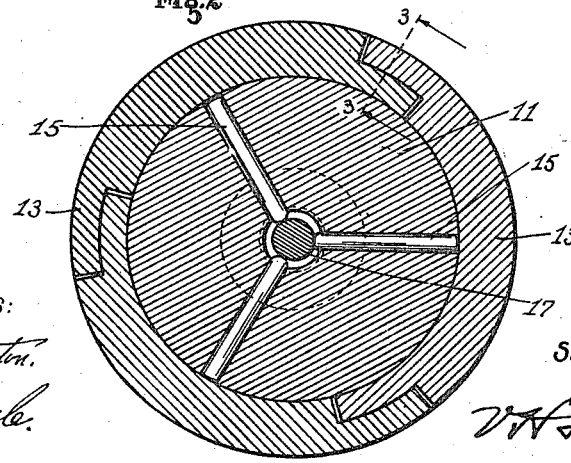
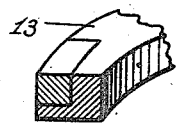
WITNESSES:
INVENTOR
Samuel J. Shaw.
BY
ATTORNEY

S. J. SHAW.
PISTON RING.
APPLICATION FILED APR. 25, 1914.

1,168,969.

Patented Jan. 18, 1916.
2 SHEETS—SHEET 2.

WITNESSES:
Q H Edgerton
J. A. Boyle.

INVENTOR.
Samuel J. Shaw.
BY W H Lockwood
ATTORNEY.

UNITED STATES PATENT OFFICE.

SAMUEL J. SHAW, OF CHICAGO, ILLINOIS, ASSIGNOR OF ONE-HALF TO ISAAC G. READING, OF TERRE HAUTE, INDIANA.

PISTON-RING.

1,168,969. Specification of Letters Patent. Patented Jan. 18, 1916.

Application filed April 25, 1914. Serial No. 834,407.

*To all whom it may concern:*

Be it known that I, SAMUEL J. SHAW, a citizen of the United States, and a resident of Chicago, county of Cook, and State of Illinois, have invented a certain new and useful Piston-Ring; and I do hereby declare that the following is a full, clear, and exact description thereof, reference being had to the accompanying drawings, in which like letters refer to like parts.

The object of this invention is to improve packing rings for pistons in cylinders and other situations where packing rings are useful.

The chief feature of the invention consists in means in the piston for expanding the packing ring very gradually and holding it expanded. Said means consists of a tapered spreader adapted to screw into the piston and spread radial pins in the piston, which engage the inner surface of the piston ring and spread it.

The nature of the invention will be understood from the accompanying drawings and the following description and claims.

Figure 4:
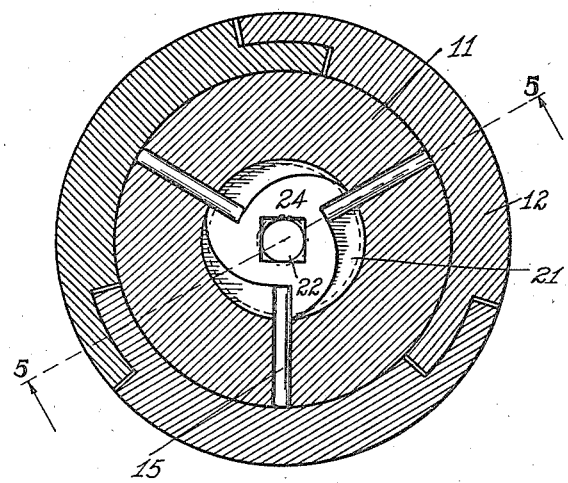
Figure 5:
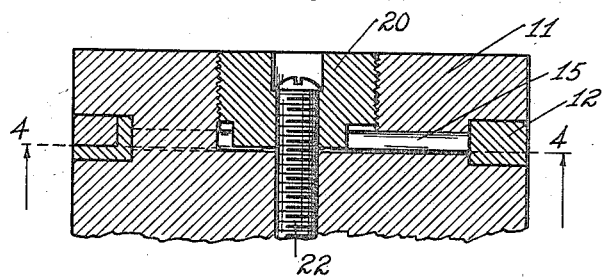

In the drawings, Figure 1 is a central vertical section through the cylinder of an engine and the piston therein, provided with said packing ring. Fig. 2 is a section on the line 2—2 of Fig. 1, through the piston and packing ring. Fig. 3 is a perspective view of a portion of the piston ring, showing one end in section on the line 3—3 of Fig. 2. Fig. 4 is a transverse section of a modified form of piston and ring. Fig. 5 is a section on the line 5—5 of Fig. 4.

In detail, there is shown a cylinder 10 and a piston 11 provided with piston rings 12 and 13. Said piston ring 13 is made of three overlapping sections of familiar type.

A number of radial pins 15 are mounted in the piston, so as to be radially slidable, and their outer ends bear against the inner surface of the piston ring 13, and their inner ends project into a hole 16 centrally and longitudinally through the piston. In one end of said hole there is a threaded spreader 17 provided intermediate its ends, with a tapering portion 17ª located between the ends of the pins 15, so that when the spreader 17 is screwed inward, it will spread said pins and the ring 13. When the spreader is screwed outward the inner ends of the pins 15, lying in the path of the offset or shoulder 18ª at the narrow end of the tapering portion 17ª will obstruct the withdrawal of the spreader, thus preventing accidental disassemblage of the parts. The pins 15 are made of some material having a slightly greater expansion under temperature changes than steel or cast iron, retaining heat longer and thereby holding the compression in the cylinder longer than the ordinary piston rings after the engine is stopped. There is also used in connection with the tapered spreader a lock nut 18, which is adapted to engage the end of the spreader, and the two parts thus are enabled to hold the pins in their exact positions after they have been adjusted, and by the adjustment of said parts they will permit the ring to cover and take up all the slack or wear and maintain thereby a perfectly tight joint. The adjustment of the spreader 17 can be made through the spark plug opening 19 in the cylinder head, so that it will be unnecessary to take the engine or cylinder apart.

The invention is not limited to use in any particular kind of piston or cylinder, but may be used in steam, gas, gasolene, oil or air engines, cylinders and pumps of any description.

In the modified form shown in Figs. 4 and 5, a somewhat different means is shown for radially actuating the pins 15 and spreading the ring sections 12. A cam lock 20 screws into a recess 21 in the head of the piston and is locked into adjusted position by a counter sunk screw 22. The inner end of the cam lock 20, as shown in Fig. 4, has a number of cam projections 24 so that when the cam lock 20 is turned to some extent, it will force the pins all outward and then the cam block can be locked by the screw 22 into adjusted position.

The invention claimed is:

1. The combination with a piston and an expansible piston ring mounted in connection therewith, of radially disposed pins in said piston in engagement with the ring, a threaded spreader screwed axially in said piston, said spreader provided intermediate the ends thereof with a tapering portion and a shoulder or offset, said tapering portion engaging the inner ends of said pins for forcing the same outward to expand the ring, the inner ends of the pins being located in the path of the shoulder or offset.

2. The combination with a piston, of an expansible piston ring, radially movable pins engaging the ring for expanding the same, and spreading means for forcing the pins outward in engagement with the rings, said pins being of material having greater expansion under temperature changes than the material of the piston and ring, and retaining heat longer.

In witness whereof, I have hereunto affixed my signature in the presence of the witnesses herein named.

SAMUEL J. SHAW.

Witnesses:
B. L. PARSONS,
E. J. QUINLAN.